United States Patent
Teoh (10) Patent No.: US 9,632,557 B2
(45) Date of Patent: Apr. 25, 2017

(54) ACTIVE STATE POWER MANAGEMENT (ASPM) TO REDUCE POWER CONSUMPTION BY PCI EXPRESS COMPONENTS

(71) Applicant: Poh Thiam Teoh, Seri Damansara (MY)

(72) Inventor: Poh Thiam Teoh, Seri Damansara (MY)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 13/631,869

(22) Filed: Sep. 29, 2012

(65) Prior Publication Data

US 2013/0086400 A1   Apr. 4, 2013

(30) Foreign Application Priority Data

Sep. 30, 2011   (MY) .............................. 2011004723

(51) Int. Cl.
*G06F 1/26* (2006.01)
*G06F 1/32* (2006.01)

(52) U.S. Cl.
CPC .......... *G06F 1/3215* (2013.01); *G06F 1/3203* (2013.01); *G06F 1/3253* (2013.01); *Y02B 60/1235* (2013.01)

(58) Field of Classification Search
CPC ..... G06F 1/3203; G06F 1/3215; G06F 1/3253
USPC ........................................................ 713/320
See application file for complete search history.

(56) References Cited

U.S. PATENT DOCUMENTS

| | | | |
|---|---|---|---|
| 5,748,539 | A | 5/1998 | Sproull et al. |
| 6,009,488 | A | 12/1999 | Kavipurapu |
| 6,128,703 | A | 10/2000 | Bourekas et al. |
| 6,772,295 | B2 | 8/2004 | Spencer et al. |
| 6,789,168 | B2 | 9/2004 | Jeddeloh |
| 6,886,085 | B1 | 4/2005 | Shuf et al. |
| 7,058,726 | B1 | 6/2006 | Osaku et al. |
| 7,299,337 | B2 | 11/2007 | Traut et al. |
| 7,310,721 | B2 | 12/2007 | Cohen |

(Continued)

FOREIGN PATENT DOCUMENTS

| | | |
|---|---|---|
| CN | 101477403 A | 7/2009 |
| CN | 101853226 A | 10/2010 |

(Continued)

OTHER PUBLICATIONS

"Universal Serial Bus 3.0 Specification", Revision 1.0, Nov. 12, 2008, 482 pages.

(Continued)

*Primary Examiner* — Mohammed Rehman
*Assistant Examiner* — Gayathri Sampath
(74) *Attorney, Agent, or Firm* — Alpine Technology Law Group LLC (57) ABSTRACT

Methods and apparatus relating to Active State Power Management (ASPM) to reduce power consumption by PCI express components are described. In one embodiment, a special packet with embedded information triggers entry into a lower power consumption state. The embedded information may include flow control credit information outstanding between two agents and the target power consumption state. Other embodiments are also disclosed and claimed.

22 Claims, 7 Drawing Sheets

(56) References Cited

U.S. PATENT DOCUMENTS

| | | |
|---|---|---|
| 7,334,076 B2 | 2/2008 | Hendel et al. |
| 7,389,400 B2 | 6/2008 | Corrigan et al. |
| 7,650,443 B1* | 1/2010 | Cavanagh, Jr. ..... G06F 13/4059 710/37 |
| 7,707,383 B2 | 4/2010 | Saripalli |
| 7,930,530 B2 | 4/2011 | Roh et al. |
| 8,161,243 B1 | 4/2012 | Wagh et al. |
| 8,225,069 B2 | 7/2012 | Fang et al. |
| 2004/0117557 A1 | 6/2004 | Paulraj et al. |
| 2004/0123278 A1 | 6/2004 | Nanja et al. |
| 2004/0210778 A1* | 10/2004 | Naveh et al. ................. 713/300 |
| 2004/0233146 A1 | 11/2004 | Nguyen |
| 2005/0086549 A1* | 4/2005 | Solomon et al. ............. 713/320 |
| 2005/0091432 A1 | 4/2005 | Adams et al. |
| 2005/0097298 A1 | 5/2005 | Cohen |
| 2005/0149562 A1 | 7/2005 | Browne et al. |
| 2005/0166024 A1 | 7/2005 | Angelo et al. |
| 2006/0075285 A1 | 4/2006 | Madukkarumukumana et al. |
| 2006/0179175 A1 | 8/2006 | Bockhaus et al. |
| 2006/0221831 A1 | 10/2006 | Wadekar et al. |
| 2006/0248364 A1* | 11/2006 | Gutman et al. ............... 713/300 |
| 2006/0259732 A1 | 11/2006 | Traut et al. |
| 2006/0288349 A1 | 12/2006 | Zimmer et al. |
| 2007/0005863 A1 | 1/2007 | Chang et al. |
| 2007/0088915 A1 | 4/2007 | Archambault et al. |
| 2007/0088919 A1 | 4/2007 | Shen et al. |
| 2007/0113044 A1 | 5/2007 | Day et al. |
| 2007/0143565 A1 | 6/2007 | Corrigan et al. |
| 2007/0168643 A1 | 7/2007 | Hummel et al. |
| 2007/0174344 A1* | 7/2007 | Goh ...................... G06F 1/3203 |
| 2007/0186046 A1 | 8/2007 | Irish et al. |
| 2007/0186071 A1 | 8/2007 | Bellows et al. |
| 2007/0206621 A1 | 9/2007 | Plamondon et al. |
| 2007/0226450 A1 | 9/2007 | Engbersen et al. |
| 2008/0075107 A1* | 3/2008 | Cherukuri et al. ........... 370/447 |
| 2008/0120487 A1 | 5/2008 | Saripalli |
| 2008/0215848 A1 | 9/2008 | Sheu et al. |
| 2008/0276029 A1* | 11/2008 | Haraden .......... G01R 31/31713 710/305 |
| 2008/0313240 A1* | 12/2008 | Freking et al. ................ 707/201 |
| 2009/0168767 A1 | 7/2009 | Anders et al. |
| 2009/0210607 A1* | 8/2009 | Hanscom ............ G06F 11/0745 710/315 |
| 2009/0235101 A1 | 9/2009 | Hisamatsu |
| 2009/0240876 A1 | 9/2009 | Okuno et al. |
| 2009/0282226 A1 | 11/2009 | Hoover et al. |
| 2010/0002758 A1 | 1/2010 | Martwick |
| 2010/0246591 A1 | 9/2010 | Gobriel et al. |
| 2010/0250889 A1 | 9/2010 | Fang et al. |
| 2010/0325257 A1 | 12/2010 | Goel et al. |
| 2011/0153924 A1 | 6/2011 | Vash et al. |
| 2011/0161702 A1 | 6/2011 | Conrad et al. |
| 2011/0167253 A1 | 7/2011 | Roh et al. |
| 2011/0246798 A1 | 10/2011 | Bilgin et al. |
| 2012/0011286 A1 | 1/2012 | Wong et al. |
| 2012/0128091 A1 | 5/2012 | Fountain |
| 2013/0007489 A1* | 1/2013 | Unnikrishnan et al. ...... 713/320 |
| 2013/0086400 A1 | 4/2013 | Teoh |
| 2013/0091365 A1 | 4/2013 | Teoh |
| 2014/0006826 A1 | 1/2014 | Wagh |

FOREIGN PATENT DOCUMENTS

| | | |
|---|---|---|
| CN | 103383661 A | 11/2013 |
| DE | 112010001467 T5 | 5/2012 |
| EP | 1145122 B1 | 4/2007 |
| EP | 2390755 A1 | 11/2011 |
| GB | 2424294 A | 9/2006 |
| JP | 10-312338 A | 11/1998 |
| JP | 2006-127407 A | 5/2006 |
| JP | 2006-252554 A | 9/2006 |
| JP | 2008-537618 A | 9/2008 |
| JP | 2009-176294 A | 8/2009 |
| KR | 2007-0082229 A | 8/2007 |
| RU | 2245578 C2 | 1/2005 |
| RU | 2004131609 A | 4/2006 |
| WO | 2006/041471 A2 | 4/2006 |
| WO | 2007/002425 A1 | 1/2007 |
| WO | 2009/045884 A2 | 4/2009 |
| WO | 2009/045884 A3 | 6/2009 |
| WO | 2010/117518 A2 | 10/2010 |
| WO | 2010/117518 A3 | 1/2011 |
| WO | 2013/048927 A1 | 4/2013 |
| WO | 2013/048943 A1 | 4/2013 |
| WO | 2014/004737 A1 | 1/2014 |

OTHER PUBLICATIONS

PCI Express, "PCI Express® Base Specification", Revision 2.0, Dec. 20, 2006, 608 pages.

International Preliminary Report on Patentability and Written Opinion received for Patent Application No. PCT/US2012/056823, mailed on Apr. 10, 2014, 5 pages.

International Preliminary Report on Patentability and Written Opinion received for PCT Patent Application No. PCT/US2012/056851, mailed on Apr. 10, 2014, 7 pages.

International Search Report and Written opinion received for PCT Application No. PCT/US2013/048000, mailed on Oct. 7, 2013, 16 pages.

International Search Report and Written Opinion received for PCT Patent Application No. PCT/US2012/056823, mailed on Mar. 4, 2013, 4 pages.

International Search Report and Written Opinion received for PCT Patent Application No. PCT/US2012/056851, mailed on Feb. 28, 2013, 8 pages.

Birrell, Andrew; "Libmc': a Multi-core Library for Beehive", Aug. 9, 2010, 8 pages.

International Preliminary Report on Patentability Received for PCT Application No. PCT/US2010/026078, mailed on Oct. 13, 2011, 5 pages.

International Search Report and Written Opinion Received PCT application No. PCT/US2010/026078 mailed on Sep. 30, 2010, 6 pages.

Office Action received for Korean Patent Application No. 10-2011-7023169, mailed on Apr. 23, 2013, 4 pages of Office Action summary.

Notice of Allowance received for Korean Patent Application No. 10-2011-7023169, mailed on Oct. 10, 2013, 3 pages including 1 page of English Translation.

Office Action received for Japanese Patent Application No. 2012-500824, mailed on Jun. 11, 2013, 6 pages, including 3 pages of English Translation.

Schaelicke et al., "Design Trade-Offs for User-Level I/O Architectures", IEEE Transactions on Computers, vol. 55, No. 8, Aug. 2006, pp. 962-973.

Wang et al., "EXOCHI: Architecture and Programming Environment for a Heterogeneous Multi-core Multithreaded System", Jun. 11-13, 2007, pp. 156-166.

Fang et al., "Active Memory Operations", Jun. 18-20, 2007, pp. 232-241.

Office Action received for U.S. Appl. No. 12/415,941, mailed on Dec. 8, 2011, 10 pages.

Notice of Allowance received for U.S. Appl. No. 12/415,941, mailed on Mar. 29, 2012, 6 pages.

Office Action received for Chinese Patent Application No. 201010157282.8, mailed on Oct. 17, 2012, 5 pages of English Translation and 3 pages of Chinese Office Action.

Office Action received for Chinese Patent Application No. 201010157282.8, mailed on Jan. 18, 2012, 12 pages of English Translation and 7 pages of Chinese Office Action.

Notice of Allowance received for Chinese Patent Application No. 201010157282.8, mailed on Feb. 4, 2013, 02 pages of English Translation and 4 pages of Chinese Notice of Allowance.

Office Action received for Russian Patent Application No. 2011141892, mailed on Nov. 15, 2012, 3 pages of English Translation Only.

(56) References Cited

OTHER PUBLICATIONS

Office Action received for Japanese Patent Application No. 2012-500824, mailed on Jun. 11, 2013, 3 pages of English Translation and 3 pages of Japanese Office Action.

Abramson et al., "Intel Virtualization Technology for Directed I/O", Intel Technology Journal, vol. 10, Aug. 10, 2006, 16 pages.

International Preliminary Report on Patentability and Written Opinion received for PCT Application No. PCT/US2008/077819, mailed on Apr. 8, 2010, 6 pages.

International Search Report and Written Opinion received for PCT Application No. PCT/US2008/077819, mailed on May 14, 2009, 11 pages.

Intel, "IA-32 Intel® Architecture Software Developer's Manual", vol. 3: System Programming Guide, 2001, 5 pages.

Office Action received for Russian Patent Application No. 2010104040 mailed on Mar. 2, 2011, 4 pages of English Translation and 8 pages of Russian Office Action.

Office Action received for German Patent Application No. 102008421.0-53, mailed on Jun. 10, 2009, 3 pages of English Translation and 3 pages of German Office Action.

Office Action received for German Patent Application No. 102008048421.0-53, mailed on Jan. 20, 2011, 2 pages of English Translation and 3 pages of German Office Action.

Office Action received for Chinese Patent Application No. 200810161925.9, mailed on Apr. 28, 2010, 11 pages of English Translation and 6 pages of Chinese Office Action.

Office Action received for Chinese Patent Application No. 200810161925.9, mailed on Mar. 24, 2011, 12 pages of English Translation and 6 pages of Chinese Office Action.

Office Action received for U.S. Appl. No. 11/906,176, mailed on Mar. 30, 2010, 15 pages.

Office Action received for U.S. Appl. No. 11/906,176, mailed on Oct. 12, 2010, 17 pages.

Office Action received for U.S. Appl. No. 11/906,176, mailed on May 5, 2011, 18 pages.

Notice of Allowance received for U.S. Appl. No. 11/906,176, mailed on Nov. 2, 2011, 10 pages.

Notice of Allowance Received for Russian Patent Application No. 2011141892, mailed on Mar. 25, 2013, 9 pages of Notice of Allowance and 1 page of Foreign Associate's reporting correspondence.

Office Action received for Chinese Patent Application No. 200810161925.9, mailed on Jul. 6, 2012, 21 pages including 11 pages of English Translation.

Office Action received for Chinese Patent Application No. 200810161925.9, mailed on Nov. 9, 2012, 20 pages including 11 pages of English Translation.

Notice of Allowance received for Russian Patent Application No. 2010104040, mailed on Dec. 3, 2012.

Notice of Allowance received for Japanese Patent Application No. 2012-500824, mailed on Dec. 3, 2013, 2 pages including 1 page of partial English Translation.

* cited by examiner

ACTIVE STATE POWER MANAGEMENT (ASPM) TO REDUCE POWER CONSUMPTION BY PCI EXPRESS COMPONENTS

CROSS REFERENCE TO RELATED APPLICATIONS

This application claims priority to Malaysian patent application PI2011004723 filed on Sep. 30, 2011 (which is incorporated herein by reference in its entirety).

FIELD

The present disclosure generally relates to the field of electronics. More particularly, some embodiments relate to Active State Power Management (ASPM) to reduce power consumption by PCI express components.

BACKGROUND

One common interface used in computer systems is Peripheral Component Interconnect (PCI) Express ("PCIe", in accordance with PCI Express Base Specification 3.0, Revision 0.5, August 2008). PCIe specification defines several Active State Power Management (ASPM) mechanism such as L0s, L1, and L2/L3 to allow PCIe controllers to save power when the link is in idle or when the platform is in idle. When a PCIe controller enters ASPM L1 state, power gating may be triggered to reduce leakage power. However, the efficiency of the power gating is directly dependent on the amount of circuitry that is power gated during this period.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

As process technology improves in dimensions, the influence of leakage power on the total power dissipated in the platform grows. While dynamic power may be reduced significantly by controlling the activity factor (e.g., through clock gating), leakage power may generally only be reduced significantly when the entire power grid is turned off (e.g., through power gating). This indicates the significance of power gating features on PCIe controllers, PCIe end points, PCIe switches, and/or PCIe root port.

To this end, some embodiments provide novel and/or efficient techniques for enhancing the PCIe Base Specification's power management by creating a new ASPM L1 named "L1_DL_RESET" (L1 Data Link Reset) which increases the efficiency of a PCIe controller's power gating by enabling more logic circuitries to be power gated, e.g., when a PCIe link is in idle. This application includes information regarding the new flow, details, enhancements, and the differences between the new ASPM L1_DL_RESET and ASPM L1.

Figure 1:
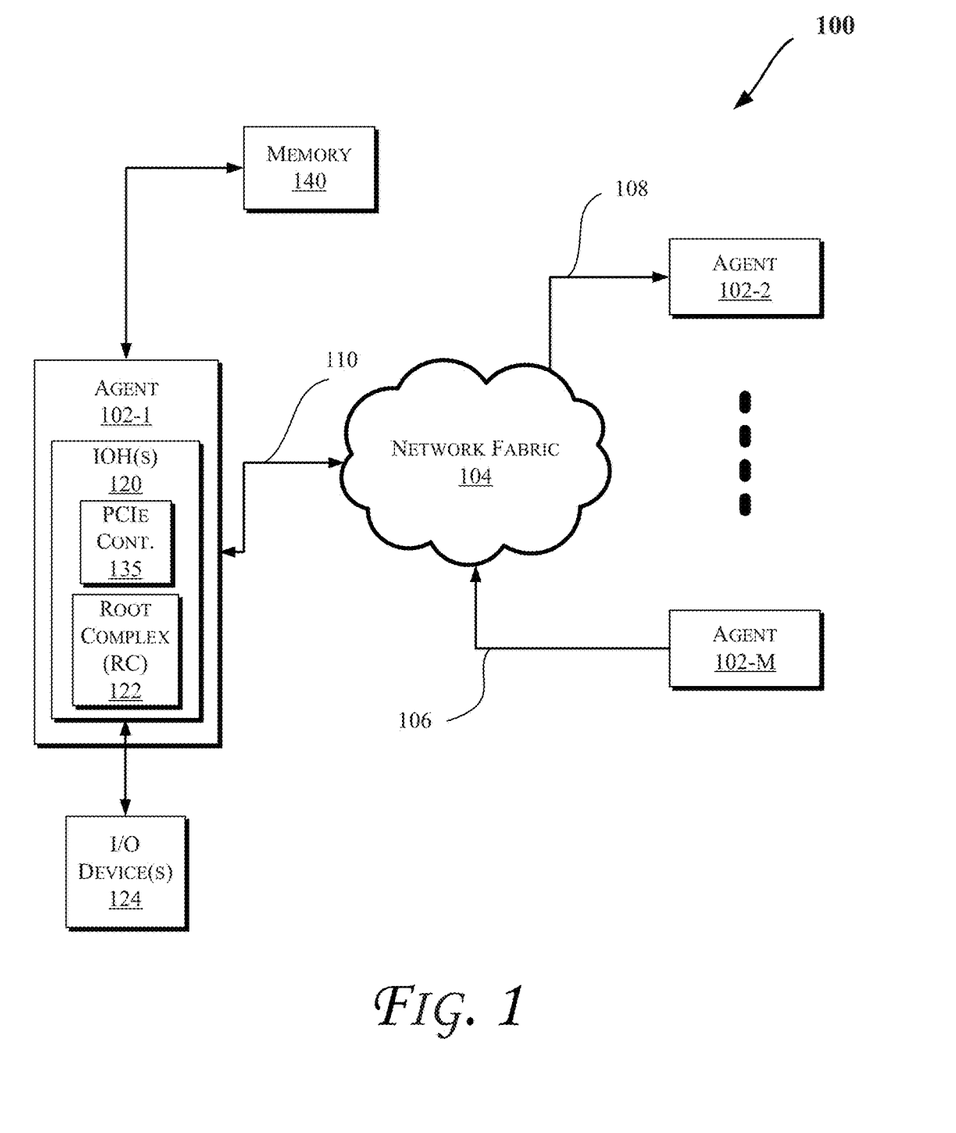
FIGS. 1-2 and 6-7 illustrate block diagrams of embodiments of computing systems, which may be utilized to implement various embodiments discussed herein.

Various embodiments are discussed herein with reference to a computing system component, such as the components discussed herein, e.g., with reference to FIGS. 1-2 and 6-7. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 6-7.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include one or more Input/Output Hubs (IOHs) 120 to facilitate communication between an agent (e.g., agent 102-1 shown) and one or more Input/Output ("I/O" or "IO") devices 124 (such as PCIe I/O devices). The IOH 120 may include a Root Complex (RC) 122 (that includes one or more root ports) to couple and/or facilitate communication between components of the agent 102-1 (such as a processor, memory subsystem, etc.) and the I/O devices 124 in accordance with PCIe specification. In some embodiments, one or more components of a multi-agent system (such as processor core, chipset, input/output hub, memory controller, etc.) may include the RC 122 and/or IOHs 120, as will be further discussed with reference to the remaining figures. Additionally, the agent 102 may include a PCIe controller 135 to manage various operations of a PCIe interface including for example power management features/aspects of PCIe components in the agent 102. Further, as illustrated in FIG. 1, the agent 102-1 may have access to a memory 140. As will be further discussed with reference to FIGS. 2-7, the memory 140 may store various items including for example an OS, a device driver, etc.

Figure 2:
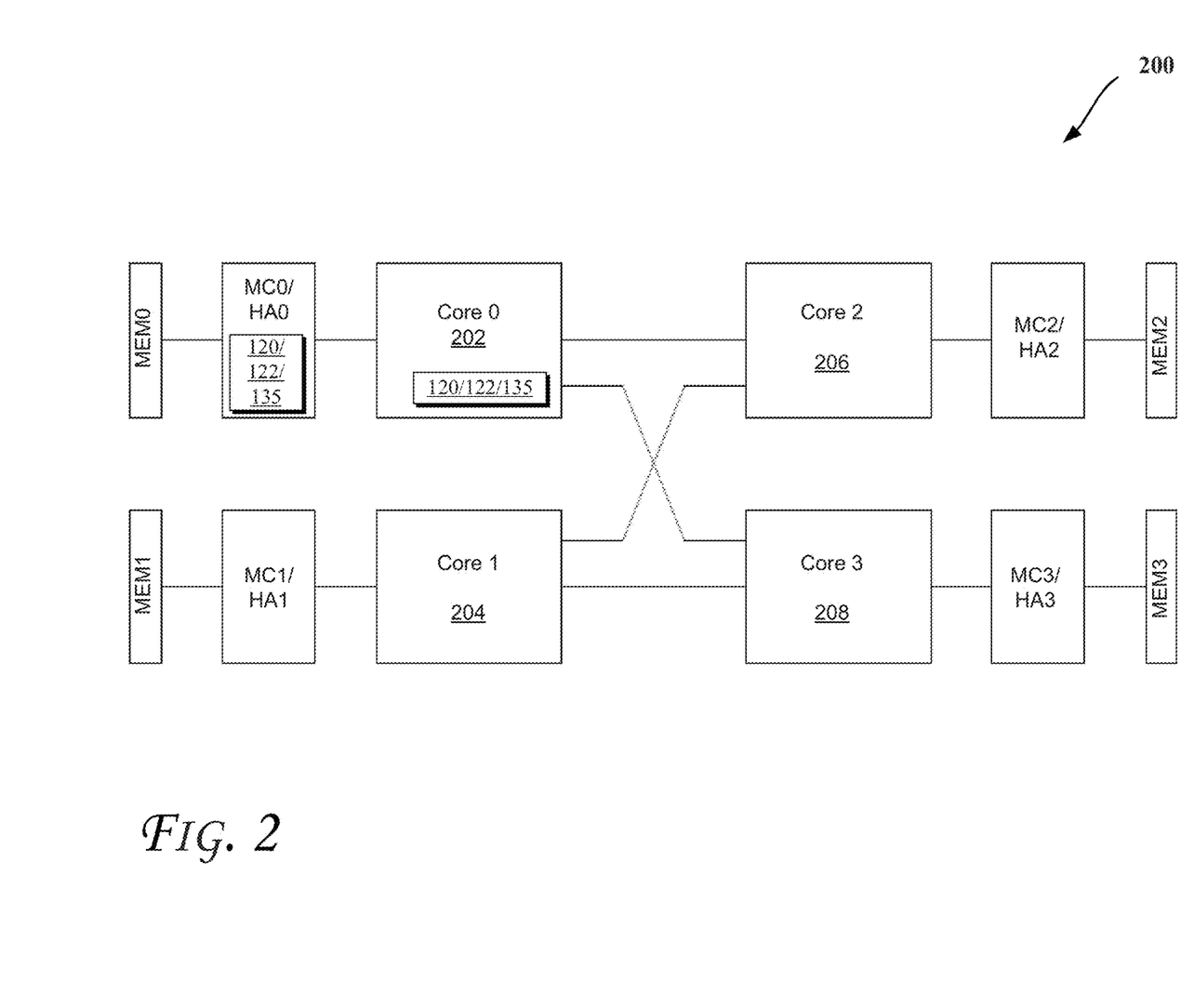

More specifically, FIG. 2 is a block diagram of a computing system 200 in accordance with an embodiment. System 200 may include a plurality of sockets 202-208 (four shown but some embodiments may have more or less socket). Each socket may include a processor and one or more of IOH 120, RC 122, and PCIe Controller 135. In some embodiments, IOH 120, RC 122, and/or PCIe Controller 135 may be present in one or more components of system 200 (such as those shown in FIG. 2). Further, more or less 120, 122, and/or 135 blocks may be present in a system depending on the implementation.

Additionally, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed by a plurality of Dual Inline Memory Modules (DIMMs) that may include dynamic random access memory (DRAM).

As shown in FIG. 2, each socket may be coupled to a Memory Controller (MC)/Home Agent (HA) (such as MC0/HA0 through MC3/HA3). The memory controllers may be coupled to a corresponding local memory (labeled as MEM0 through MEM3), which may be a portion of system memory (such as memory 412 of FIG. 4). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory devices discussed with reference to any of the figures herein. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

Furthermore, one implementation (such as shown in FIG. 2) may be for a socket glueless configuration with mirroring. For example, data assigned to a memory controller (such as MC0/HA0) may be mirrored to another memory controller (such as MC3/HA3) over the PtP links.

Moreover, in PCIe Base Specification, when a PCIe controller (e.g., PCIe controller 135) exits ASPM L1 to re-enter the fully functional L0 state, most of the context of the PCIe Link is not exchanged between the Upstream component and Downstream component. Therefore, it is expected that when a PCIe controller triggers power gating during ASPM L1, the PCIe controller is required to retain power on the logics that stored the link's context information in order not to lose the context information. In one embodiment, the new L1_DL_RESET may require less link context to be stored by a PCIe controller in comparison to ASPM L1. The differences in the flow and detail specification of L1_DL_RESET in comparison to ASPM L1 is further discussed below.

Figure 3A:
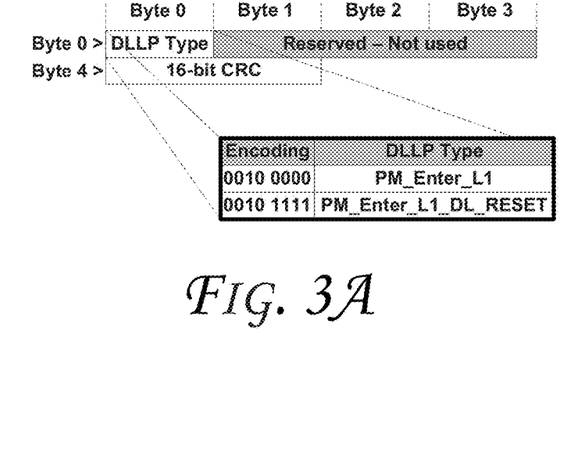
FIGS. 3A-3C illustrate information regarding a Data Link Layer Packet (DLLP) for power management, according to some embodiments.

Referring to FIG. 3A, information regarding a Data Link Layer Packet (DLLP) for power management is illustrated, according to an embodiment. As shown, the packet may include a DLLP type portion at byte 0. In one embodiment, the encoding shown may be used for PM (Power Management) entering L1 (PM_Enter_L1) and PM entering L1_DL_RESET. Moreover, entry to L1 may be communicated through a PM DLLP by the Downstream component in some embodiments. The new ASPM L1_DL_RESET may utilize the DLLP type shown in FIG. 3A.

Figure 3B:
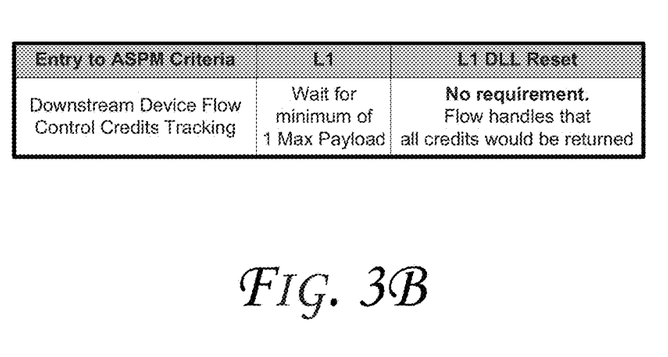

FIG. 3B shows information regarding ASPM entry criteria, according to an embodiment. In comparison with ASPM L1 which requires a Downstream component to wait for a minimum of one Max Payload credit, ASPM L1_DL_RESET does not require such criteria. In an embodiment, entry to ASPM L1_DL_RESET smartly embeds the credit information in the DLLP, e.g., when the Upstream component sends the PM_Request_Ack, and hence would shorten the entry to ASPM (as DLLP Credit may be lost in the case of L1 entry).

Furthermore, as specified in the PCIe Base specification, when a PCIe controller is in ASPM L1, not all the Flow Control Credits may be fully "returned" (as only minimum credits is required to enter L1). Therefore, when the PCIe controller re-enters L0 state from ASPM L1, the PCIe controller would resume the Flow Control Update from the remaining credits to send TLPs (Transaction Layer Packets). In an embodiment on the other hand, ASPM L1_DL_RESET requires all the Flow Control Credits to be returned with the requirement for the Upstream Component to ensure all the Credit Limit(s) have been transmitted before sending PM_Request_Ack DLLP. In some embodiments, once the Downstream Component receives the PM_Request_Ack DLLP, it will indirectly know that all the credit(s) have been returned. One advantage of having the PCIe Device Flow Control Credits fully returned is that all Flow Control Tracking related logics may now be power gated during ASPM L1_DL_RESET. The Flow Control Credits between the Upstream component and Downstream component would therefore be able to be reinitialized when the PCIe link wakes up from L1_DL_RESET to re-enter L0 (since all Flow Control Credits are returned prior to ASPM L1_DL_RESET).

Figure 3C:
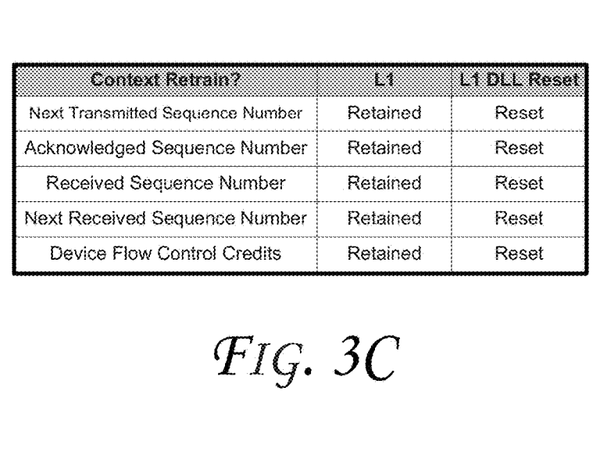

Moreover, for the PCIe Base Specification, since the entry flow to ASPM L1 requires all the TLPs to be acknowledged first, there is no actual usages from the specification perspective to retain the Sequence ID (identifier) information. In ASPM L1_DL_RESET, all the context related to tracking TLPs will be reset in an embodiment. This enables ASPM L1_DL_RESET to achieve much higher power savings compared to ASPM L1, in part, because all TLP tracking logics may now be power gated. The stored context information differs between ASPM L1 and ASPM L1_DL_RESET as shown in FIG. 3C.

Figure 4:
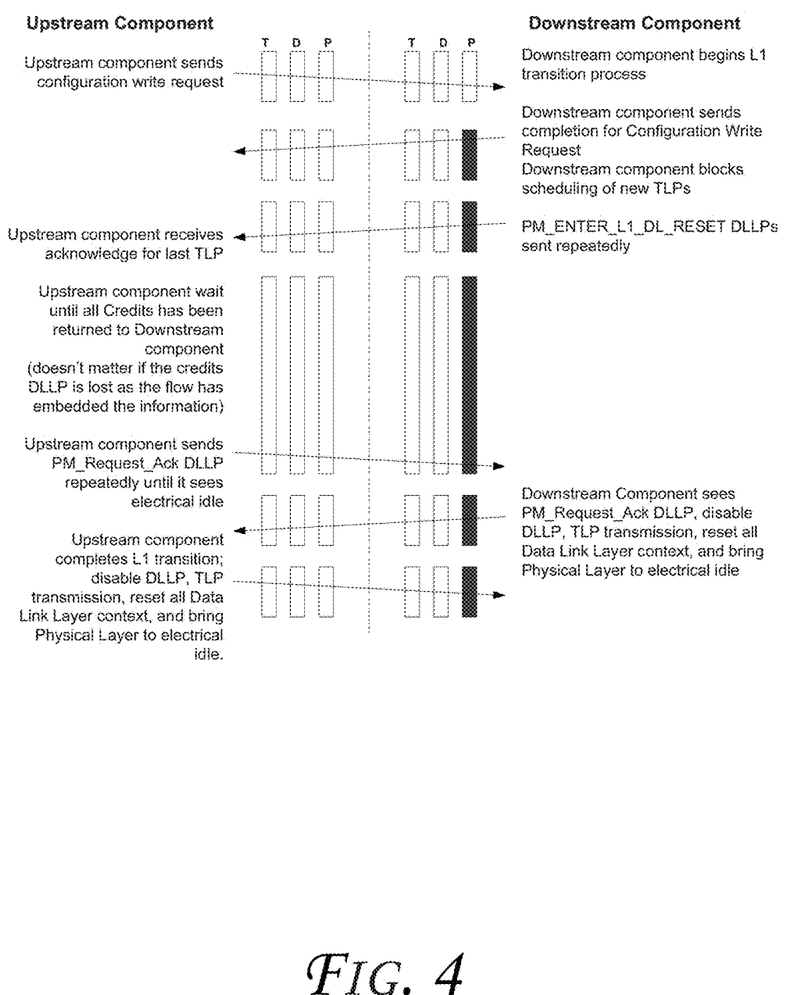
FIGS. 4-5 illustrate flow diagrams in accordance with some embodiments.

FIG. 4 illustrates a flow diagram of operations relating to entry into L1_DL_RESET, according to an embodiment. In ASPM L1_DL_RESET flow, the Upstream component ensures that all the Credits (Flow Control DLLP) are returned to the Downstream component before sending down PM_Request_Ack DLLP in accordance with an embodiment. The Downstream component upon receiving the PM_Request_Ack DLLP would know that all Flow Control Credits had been returned, without accumulating minimum credits as is done in PCIe base specification. This embeds Flow Control Credit protocol into PM_Request_Ack DLLP in a much more robust fashion when compared to PCIe L1 entry flow which requires the Downstream component to wait for minimum credits (in which Flow Control DLLP may be corrupted and required to for subsequent 30 us for each Flow Control update).

Figure 5:
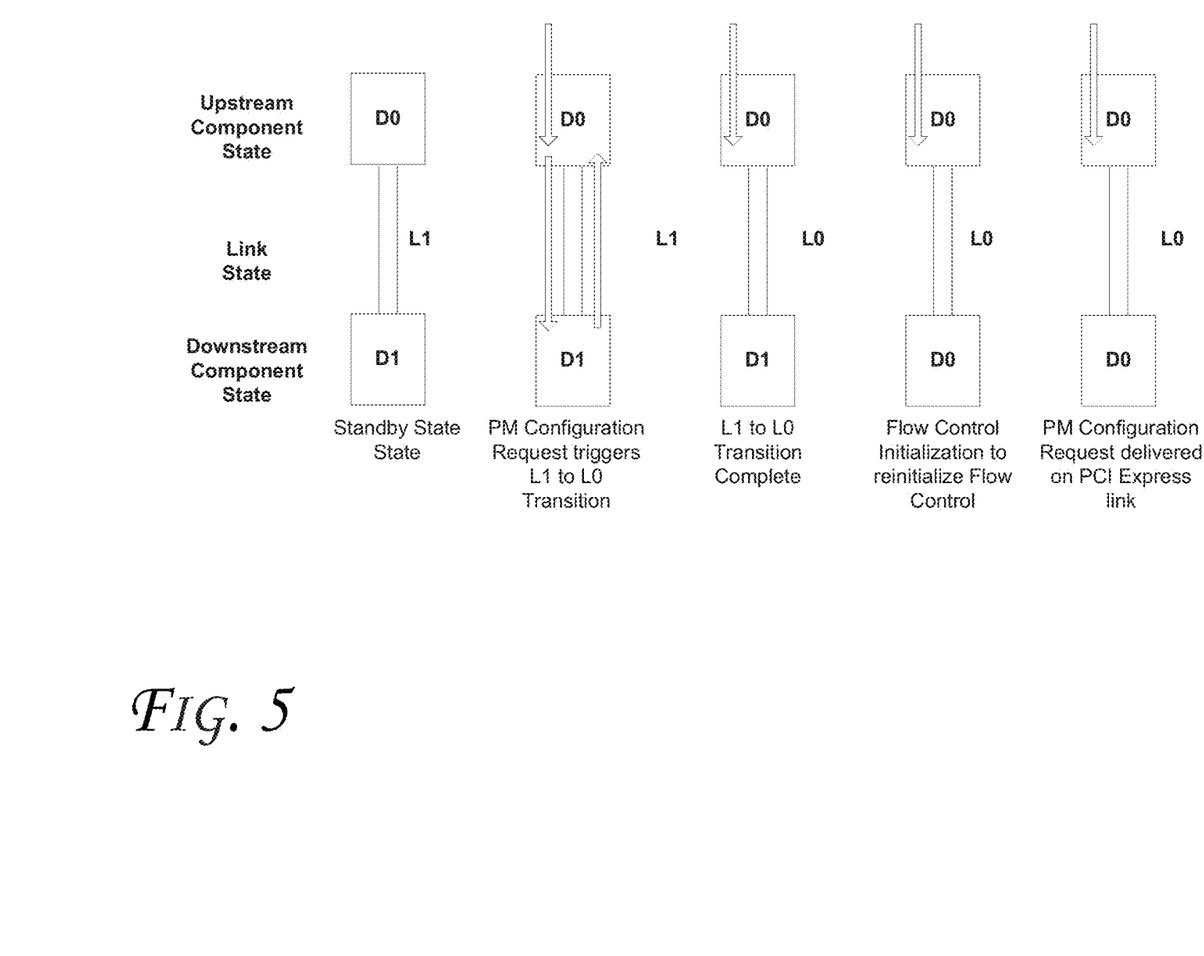

FIG. 5 illustrates a flow diagram of exit from L1_DL_RESET, according to an embodiment. The ASPM L1_DL_RESET exit flow is partially similar to ASPM L1 exit flow. However, an additional Flow Control Initialization is used to re-establish the credits between the agents coupled via the PCIe link. This is shown in FIG. 5. Upon exiting ASPM L1_DL_RESET, the PCIe link will be the fully functional PCIe L0 state.

In some embodiments, one or more of the operations discussed with reference to FIGS. 4 and/or 5 are performed by a PCIe controller. For example, the new ASPM discussed herein may be implemented in the PCIe Controller 135. This new ASPM has a more robust entry flow in comparison to ASPM L1 and has a higher power gating efficiency in comparison to ASPM L1.

Figure 6:
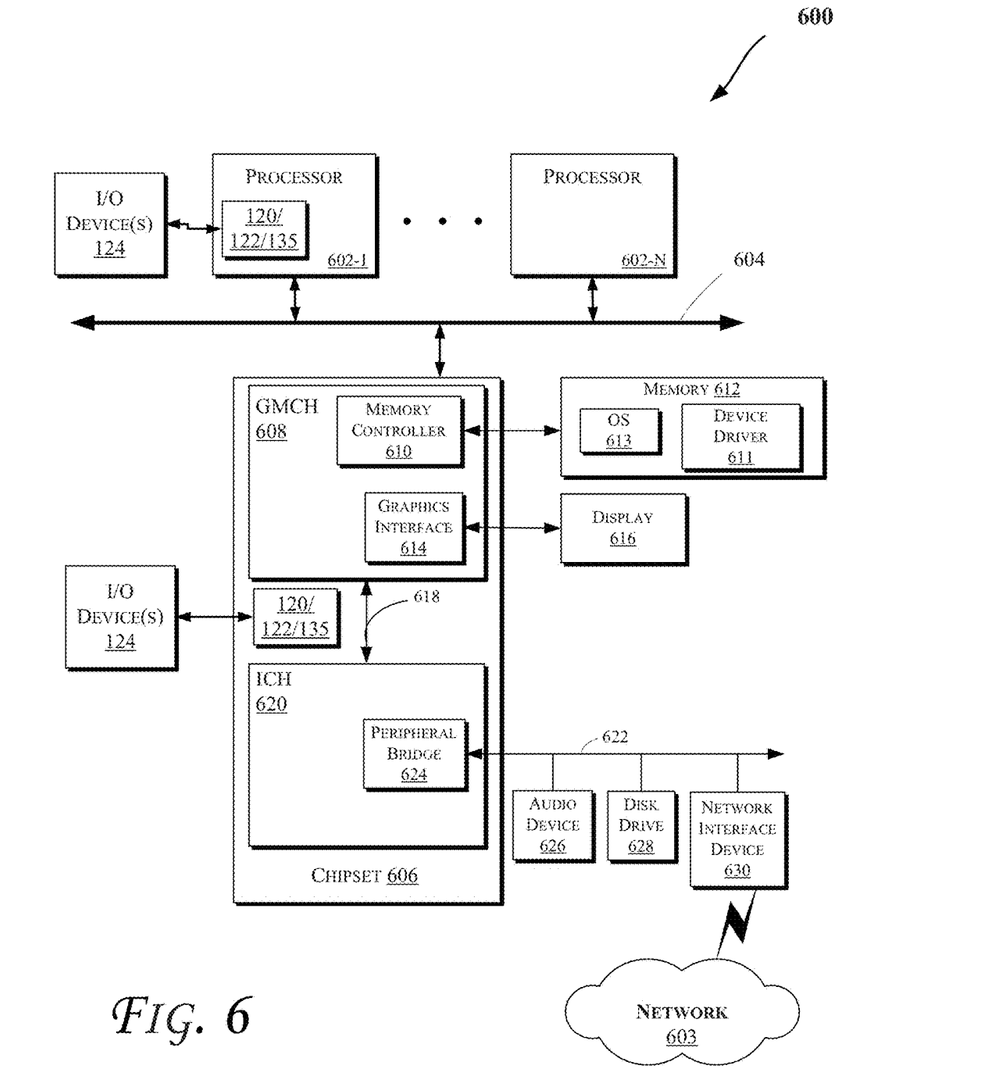

FIG. 6 illustrates a block diagram of a computing system 600 in accordance with an embodiment of the invention. The computing system 600 may include one or more central processing unit(s) (CPUs) 602-1 through 602-N or processors (collectively referred to herein as "processors 602" or more generally "processor 602") that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

Also, the operations discussed with reference to FIGS. 1-5 may be performed by one or more components of the system 600. In some embodiments, the processors 602 may be the same or similar to the processors 202-208 of FIG. 2. Furthermore, the processors 602 (or other components of the system 600) may include one or more of the IOH 120, RC 122, and the PCIe Controller 135. Moreover, even though FIG. 6 illustrates some locations for items 120/122/135, these components may be located elsewhere in system 600. For example, I/O device(s) 124 may communicate via bus 622, etc.

A chipset 606 may also communicate with the interconnection network 604. The chipset 606 may include a graphics and memory controller hub (GMCH) 608. The GMCH 608 may include a memory controller 610 that communicates with a memory 612. The memory 612 may store data, including sequences of instructions that are executed by the CPU 602, or any other device included in the computing system 600. For example, the memory 612 may store data corresponding to an operation system (OS) 613 and/or a device driver 611 as discussed with reference to the previous figures. In an embodiment, the memory 612 and memory 140 of FIG. 1 may be the same or similar. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

Additionally, one or more of the processors 602 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 600. For example, the cache may locally cache data stored in a memory 612 for faster access by the components of the processors 602. In an embodiment, the cache (that may be shared) may include a mid-level cache and/or a last level cache (LLC). Also, each processor 602 may include a level 1 (L1) cache. Various components of the processors 602 may communicate with the cache directly, through a bus or interconnection network, and/or a memory controller or hub.

The GMCH 608 may also include a graphics interface 614 that communicates with a display device 616, e.g., via a graphics accelerator. In one embodiment of the invention, the graphics interface 614 may communicate with the graphics accelerator via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the GMCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the GMCH 608 in some embodiments of the invention. In addition, the processor 602 and one or more components of the GMCH 608 and/or chipset 606 may be combined to form a single integrated circuit chip (or be otherwise present on the same integrated circuit die).

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
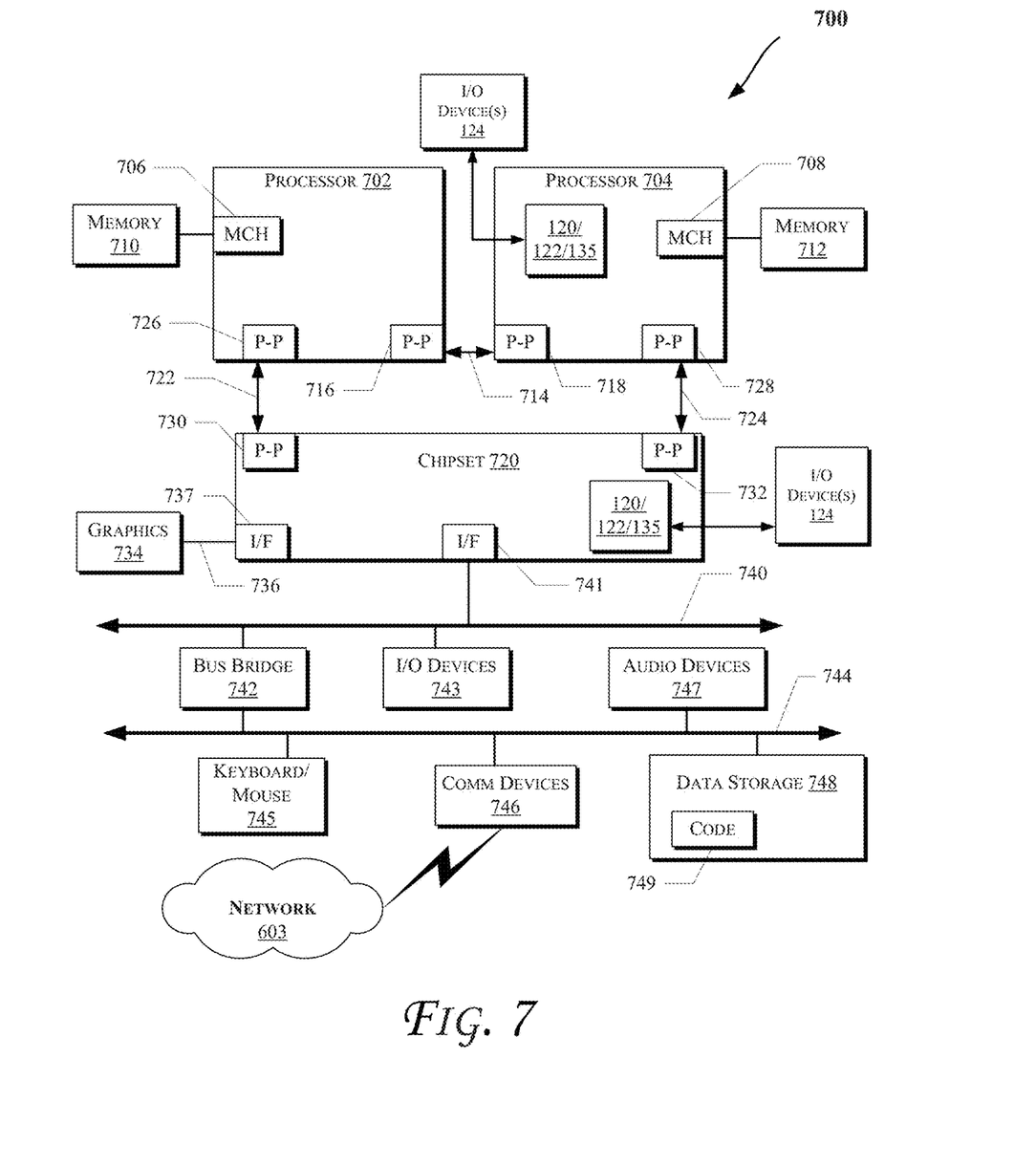

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6. As shown in FIG. 7, the processors 702 and 704 may also include the cache(s) discussed with reference to FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

At least one embodiment of the invention may be provided within the processors 702 and 704 or chipset 720. For example, the processors 702 and 704 and/or chipset 720 may include one or more of the IOH 120, RC 122, and the PCIe Controller 135. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7. Hence, location of items 120/122/135 shown in FIG. 7 is exemplary and these components may or may not be provided in the illustrated locations.

The chipset 720 may communicate with a bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a first agent to comprise controller logic to cause a link to enter a low power consumption state in response to a Data Link Layer Packet (DLLP),
   wherein the DLLP is to indicate a request to enter the low power consumption state and wherein the DLLP is to comprise flow control credit information, shared amongst the first agent and the second agent, wherein the first agent is to comprise a downstream component and the second agent is to comprise an upstream component, wherein the link is to couple the first agent and the second agent, wherein the DLLP is to cause embedding of the flow control credit information in response to transmission of an acknowledgement signal from the upstream component, wherein the upstream component is to ensure all credit limits have been transmitted before transmission of the acknowledgement signal, wherein the link is to enter the low power consumption state in response to transmission of the acknowledgement signal.

2. The apparatus of claim 1, wherein the low power consumption state is to comprise an L1 state.

3. The apparatus of claim 2, wherein the DLLP is to indicate entering the L1 state or L1_DL_RESET state.

4. The apparatus of claim 2, wherein all flow control credits, between the first and second agents, are to be returned prior to entry into the L1 state.

5. The apparatus of claim 1, wherein the controller logic is to cause re-initialization of flow control credits between the first agent and the second agent after exiting the new power consumption state.

6. The apparatus of claim 1, wherein the first agent is to comprise a root complex to facilitate communication between the first agent and the second agent over the link.

7. The apparatus of claim 1, wherein the first agent is to comprise one or more of: a processor core, a chipset, an input/output hub, or a memory controller.

8. The apparatus of claim 1, wherein the second agent is to comprise an input/output device.

9. The apparatus of claim 1, wherein the link is to comprise a point-to-point coherent interconnect.

10. The apparatus of claim 1, wherein the first agent is to comprise a plurality of processor cores and one or more sockets.

11. The apparatus of claim 1, wherein one or more of the first agent, the second agent, and the memory are on a same integrated circuit chip.

12. A method comprising:
receiving a Data Link Layer Packet (DLLP); and
causing a link, coupling a first agent and a second agent, to enter a low power consumption state in response to the DLLP, wherein the first agent is to comprise a downstream component and the second agent is to comprise an upstream component,
wherein the DLLP is to indicate a request to enter the low power consumption state and wherein the DLLP is to comprise flow control credit information, shared amongst the first agent and the second agent, wherein the DLLP causes embedding of the flow control credit information in response to transmission of an acknowledgement signal from the upstream component, wherein the upstream component is to ensure all credit limits have been transmitted before transmission of the acknowledgement signal, wherein the link enters the low power consumption state in response to transmission of the acknowledgement signal.

13. The method of claim 12, wherein the low power consumption state is to comprise an L1 state, wherein the DLLP is to indicate entering the L1 state or L1_DL_RESET state.

14. The method of claim 12, further comprising causing re-initialization of flow control credits between the first agent and the second agent after exiting the low power consumption state.

15. A computing system comprising:
a first processor core and an input/output device;
an input/output hub to couple the first processor core and the input/output device via a point-to-point link; and
the input/output hub to comprise controller logic to cause the point to point link to enter a low power consumption state in response to a Data Link Layer Packet (DLLP),
wherein the DLLP is to indicate a request to enter the low power consumption state and wherein the DLLP is to comprise flow control credit information, shared amongst the input/output device and the first processor core, wherein the input/output device is to comprise an upstream component and the first processor core is to comprise a downstream component, wherein the DLLP is to cause embedding of the flow control credit information in response to transmission of and acknowledgement signal from the upstream component, wherein the upstream component is to ensure all credit limits have been transmitted before transmission of the acknowledgement signal, wherein the point-to-point link is to enter the low power consumption state in response to transmission of the acknowledgement signal.

16. The system of claim 15, wherein the new power consumption state is to comprise an L1 state.

17. The system of claim 15, wherein all flow control credits, between the input/output device and the first processor core, are to be returned prior to entry into the L1 state.

18. The system of claim 15, wherein the controller logic is to cause re-initialization of flow control credits between the input/output device and the processor core after exiting the low consumption state.

19. The system of claim 15, further comprising a plurality of processor cores coupled to the input/output hub.

20. The apparatus of claim 1, wherein all context related to tracking transaction layer packets are to be reset in response to the DLLP.

21. The apparatus of claim 1, wherein TLP (Transaction Layer Packet) tracking logic is to be power gated during the low power consumption state.

22. The apparatus of claim 1, wherein all flow control tracking logic is to be power gated during the low power consumption state.

* * * * *